UNITED STATES PATENT OFFICE.

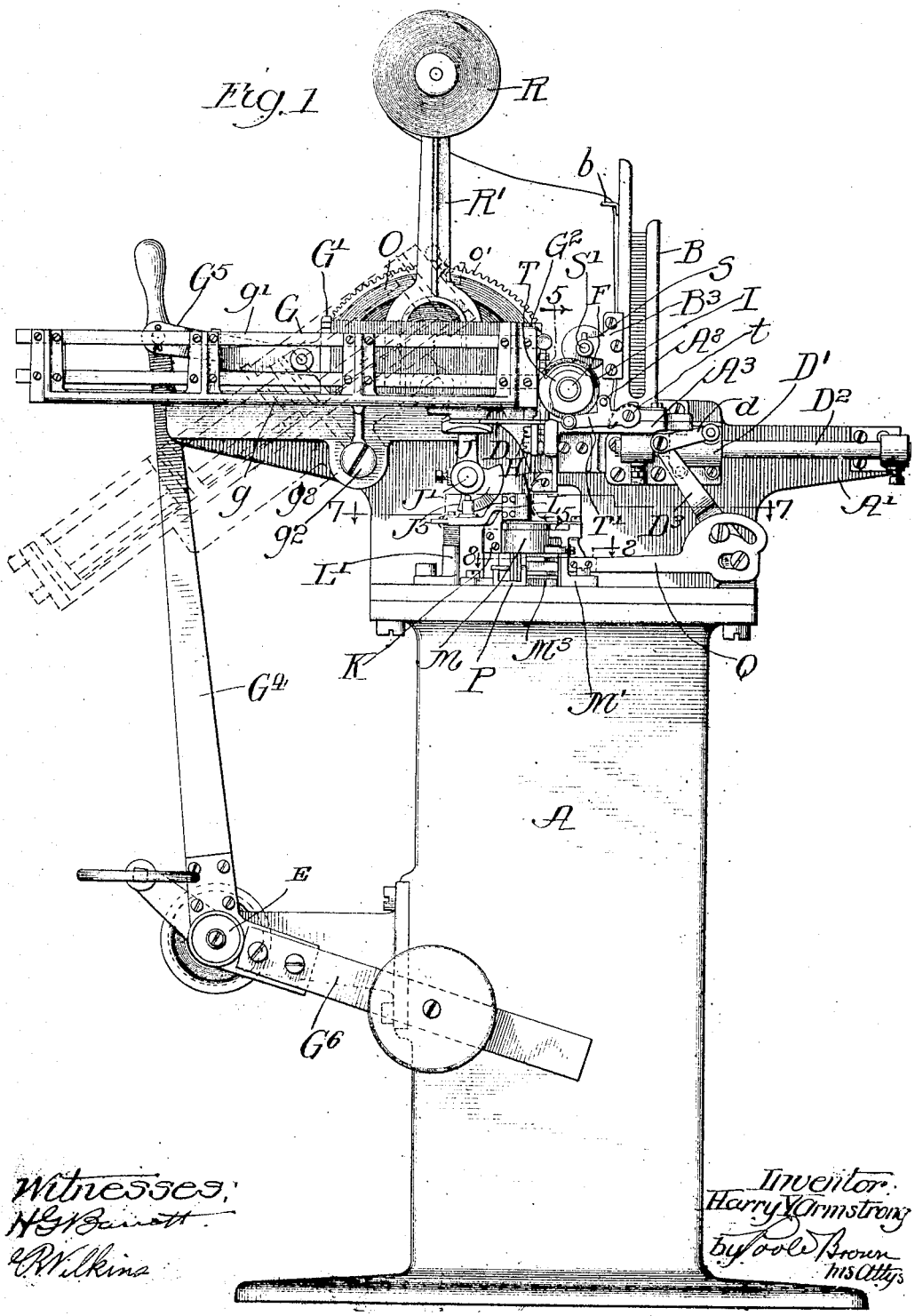

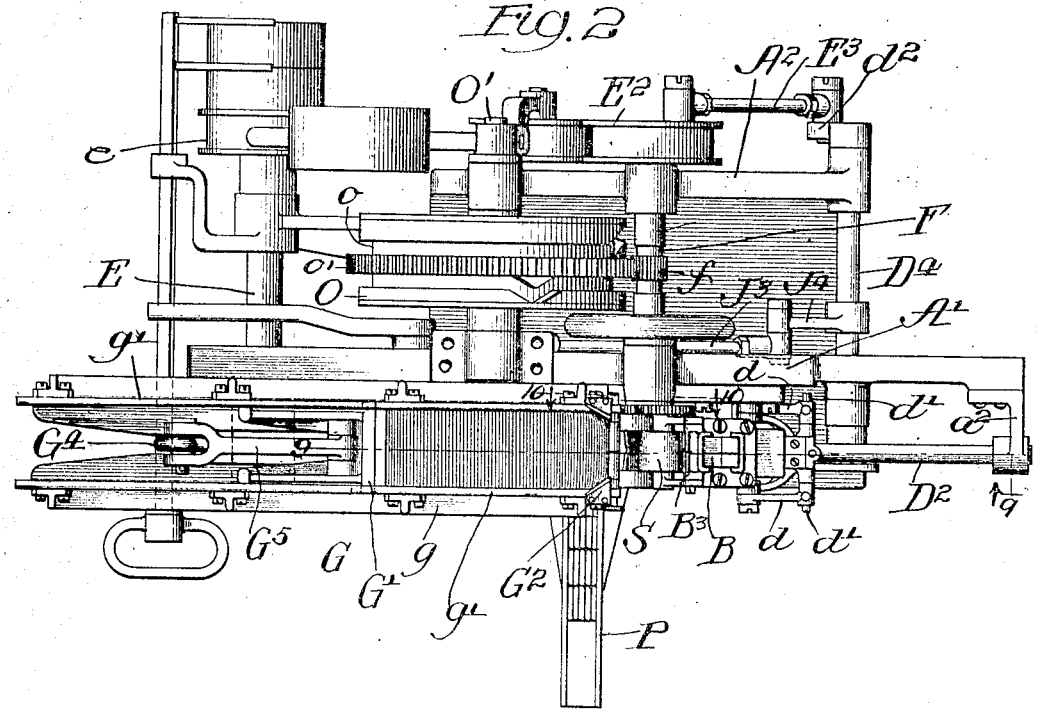
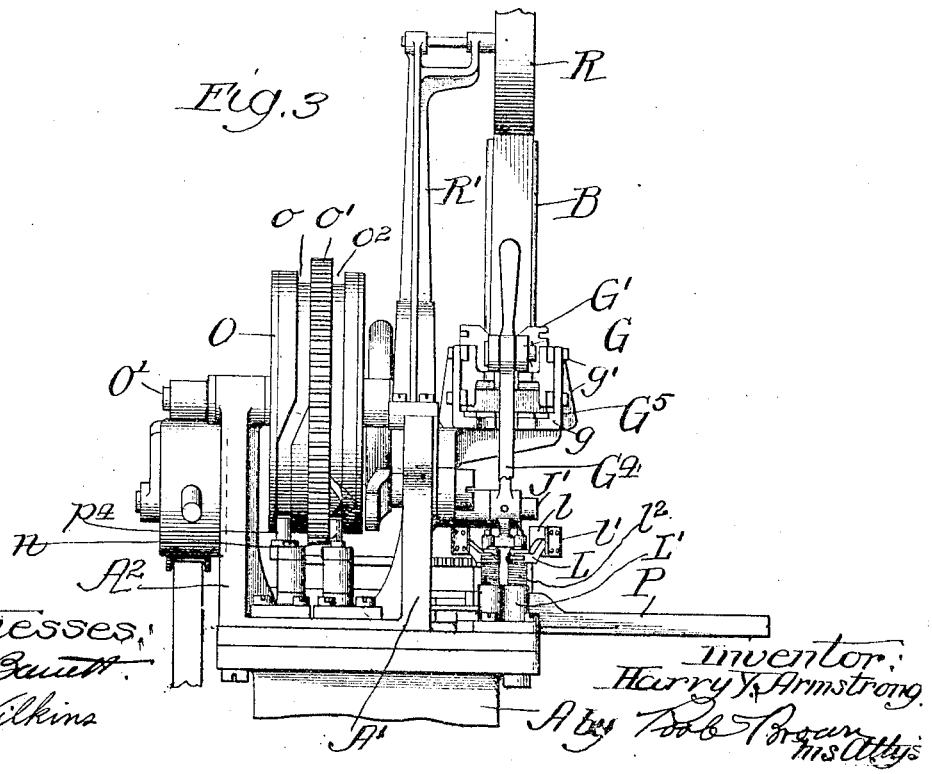

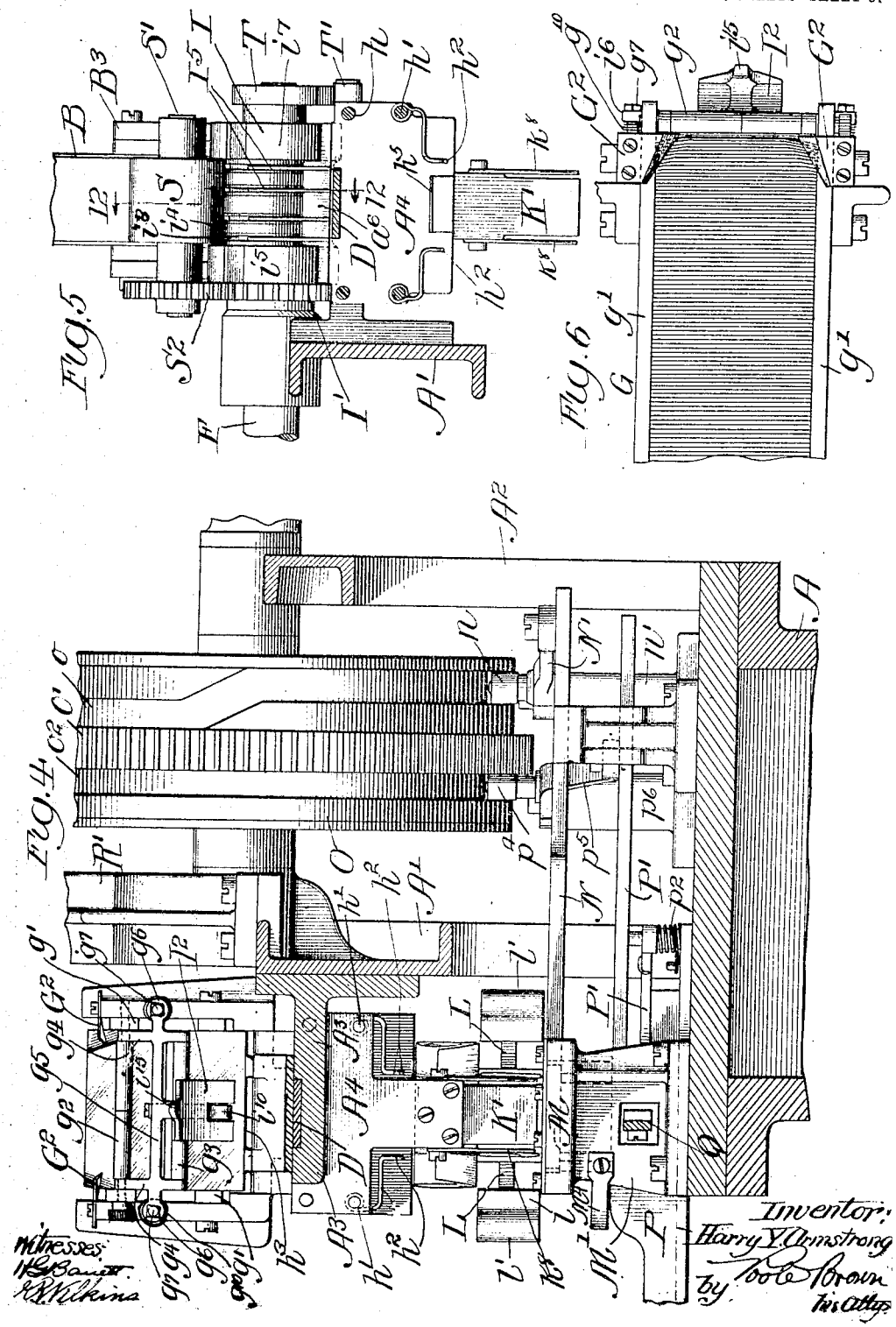

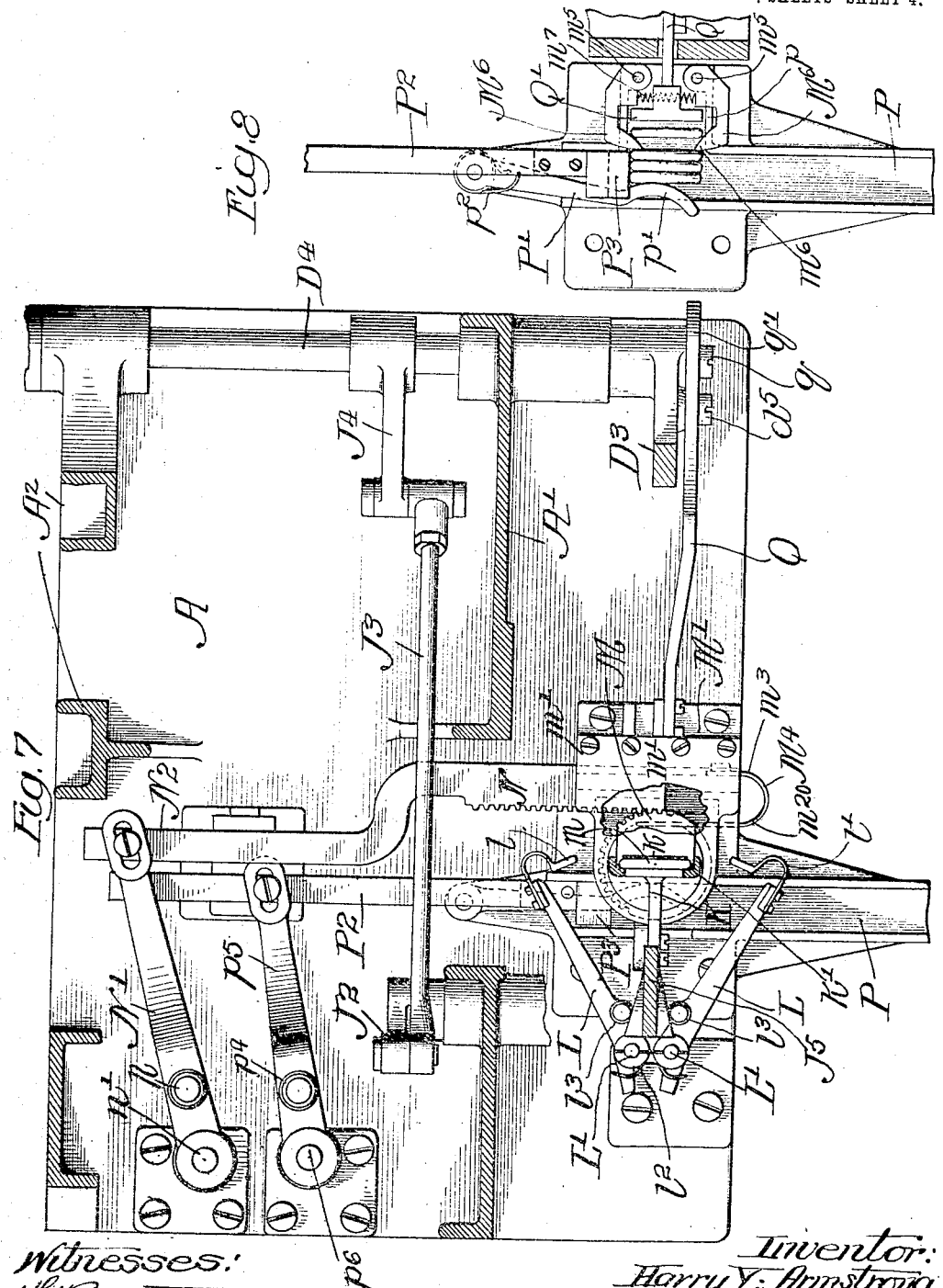

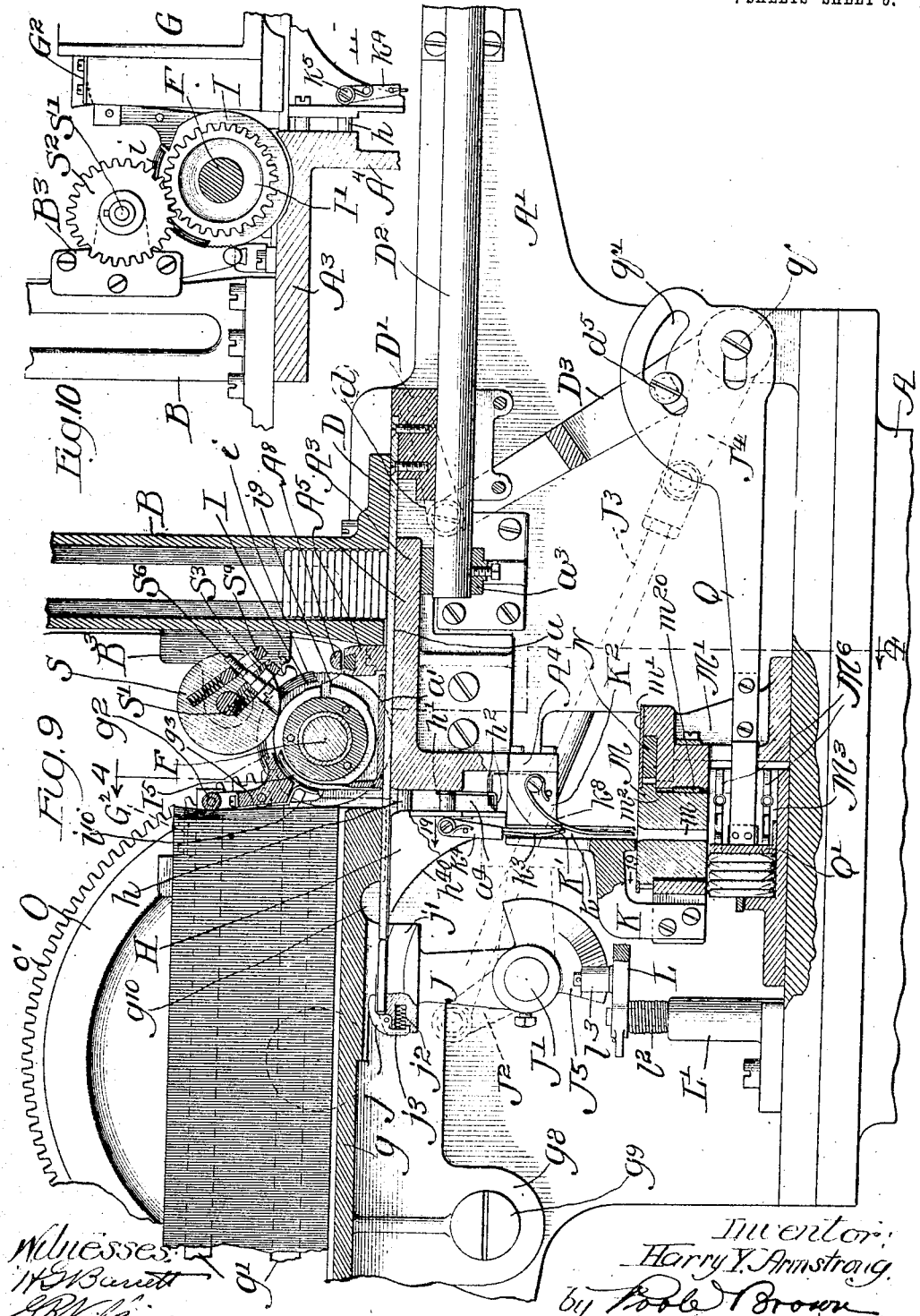

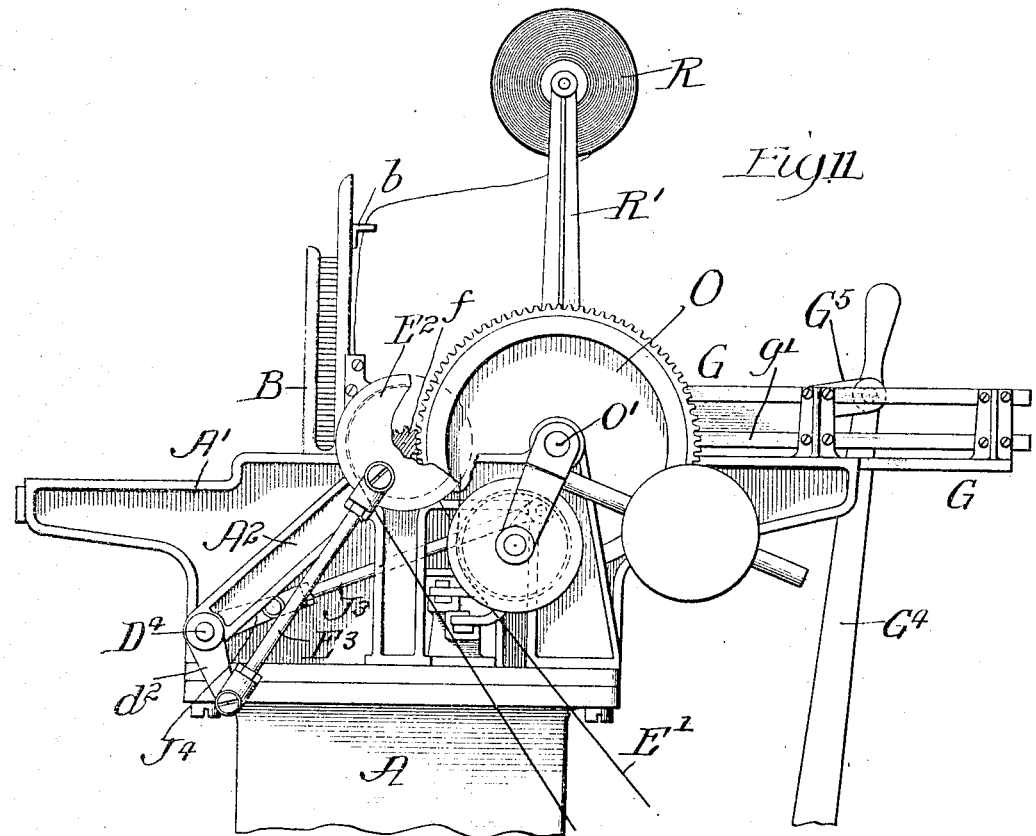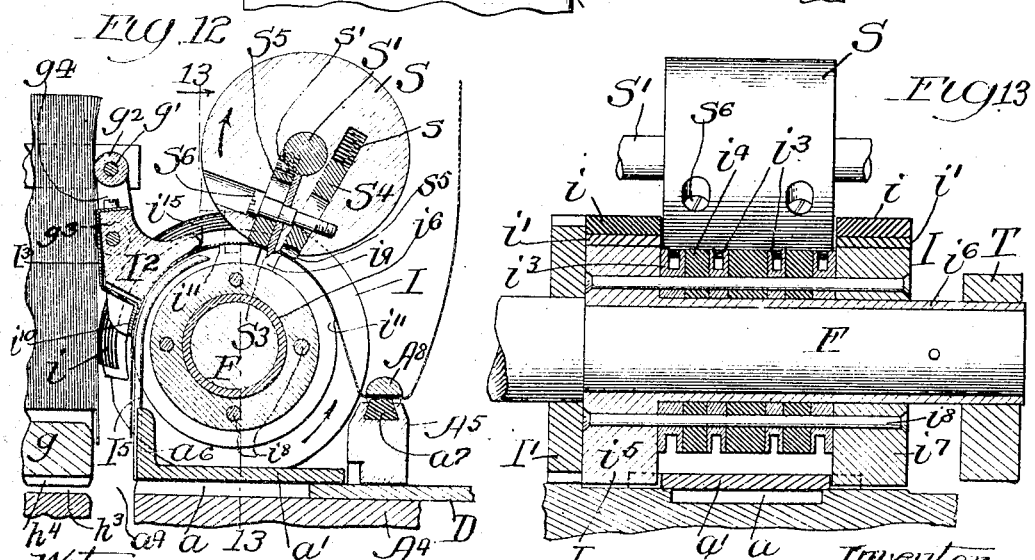

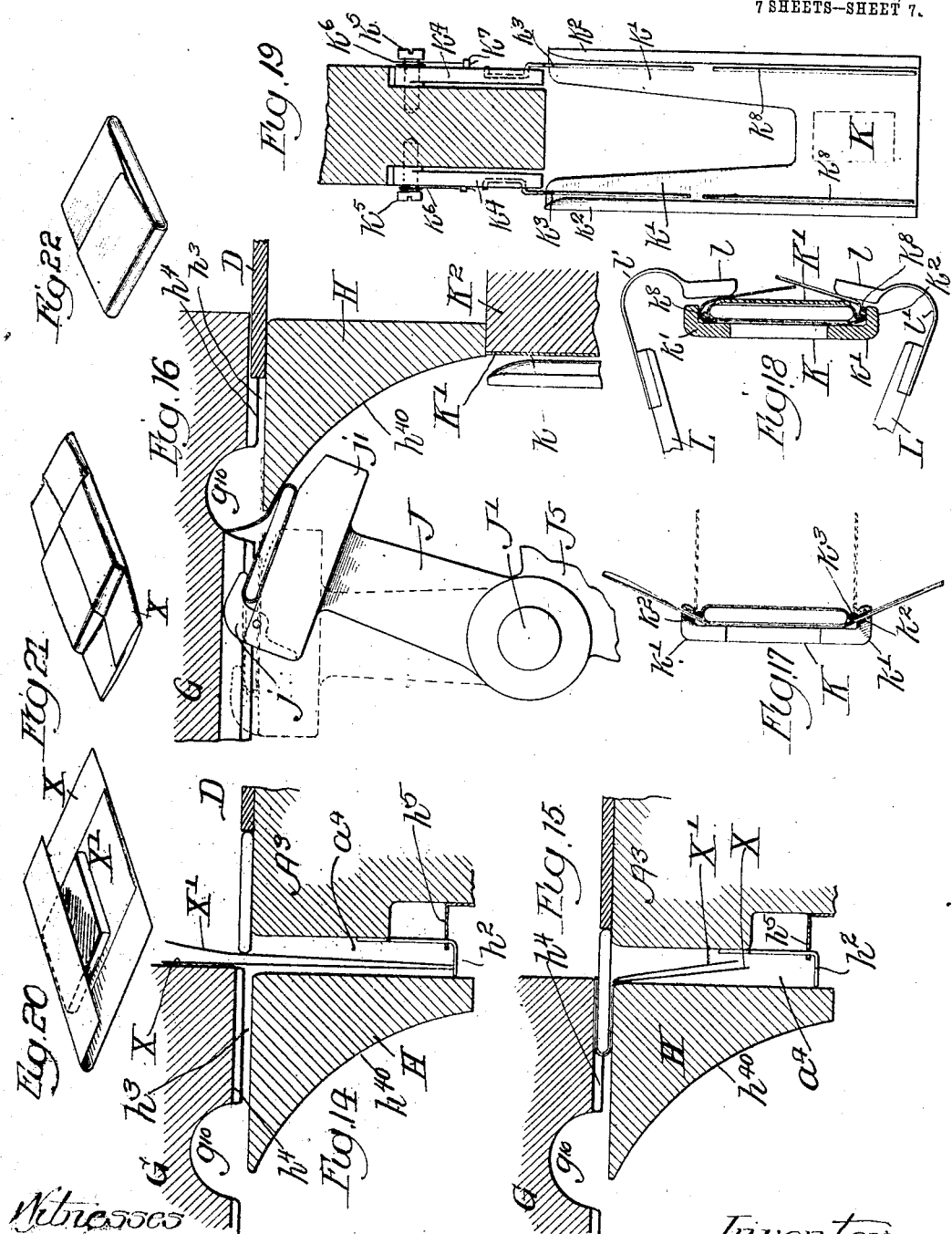

HARRY Y. ARMSTRONG, OF ELGIN, ILLINOIS.

WRAPPING-MACHINE.

No. 918,641.

Specification of Letters Patent.

Patented April 20, 1909.

Application filed March 21, 1906. Serial No. 307,240.

*To all whom it may concern:*

Be it known that I, HARRY Y. ARMSTRONG, a citizen of the United States, of Elgin, in the county of Kane and State of Illinois, have invented certain new and useful Improvements in Wrapping-Machines; and I do hereby declare that the following is a full, clear, and exact description thereof, reference being had to the accompanying drawings, and to the letters of reference marked thereon, which form a part of this specification.

This invention relates to improvements in machines for wrapping small thin articles, such as squares or sticks of chewing gum and the like, and the principal object of the invention is to provide a machine for this purpose capable of continuously and automatically wrapping such articles at a high speed, and thereby reduce the cost of such wrapping operation as compared to the present practice of doing this work.

The invention consists in the matters hereinafter set forth and more particularly pointed out in the appended claims.

In the drawings:—Figure 1 is a side elevation of a machine made in accordance with my invention. Fig. 2 is a top plan view thereof. Fig. 3 is an end view of the main operative parts of the machine. Fig. 4 is a vertical section, taken on line 4—4 of Fig. 9, looking in the direction indicated by the arrow. Fig. 5 is a vertical section, taken on line 5—5 of Fig. 1, looking in the direction indicated by the arrow. Fig. 6 is a top plan view of the inner end of the wrapper magazine. Fig. 7 is an enlarged horizontal section, taken on line 7—7 of Fig. 1, looking downwardly. Fig. 8 is a detail horizontal section, taken on line 8—8 of Fig. 1, looking downwardly. Fig. 9 is a vertical section, taken on line 9—9 of Fig. 2, looking in the direction indicated by the arrow. Fig. 10 is a vertical detail section, taken on line 10—10 of Fig. 2, looking in the direction indicated by the arrows. Fig. 11 is a partial side view of the machine, showing parts of the driving mechanism. Fig. 12 is a detail vertical section, taken on line 12—12 of Fig. 5, and showing also the adjacent end of the wrapper magazine. Fig. 13 is a vertical section, taken on line 13—13 of Fig. 12, looking in the direction indicated by the arrow. Figs. 14 to 18, both inclusive, indicate the successive steps of the wrapping operation, showing only such parts of the mechanism as is necessary to understand the relation and operation thereof. Fig. 19 is a vertical detail section, taken on line 19—19 of Fig. 9, looking in the direction indicated by the arrow. Figs. 20, 21 and 22 illustrate the manner of folding the wrapper about the article, without reference to the mechanism.

The wrapping machine, herein illustrated as one embodiment of my invention, embraces, in general terms, a suitable feed chute in which the pieces of gum or like articles to be wrapped are stacked one upon the other, a feed slot connecting the bottom of the chute with the wrapping mechanism and part of which constitutes the bottom of said chute, a feed bar reciprocating through the bottom of said chute and said feed slot and operating in each forward movement therethrough to remove the lowermost article in said stack, means for feeding the wrappers of the required size in the path of the articles to be wrapped, and suitable folding mechanisms to which are delivered the articles and wrapper and which operates to fold the wrapper about said article. The articles are wrapped one by one and are thereafter deposited in groups of a desired number into a suitable discharge chute and discharged as such groups from the machine. In some instances it is desirable to employ an inner moisture-proof lining or wrapper, and means are provided for delivering both the inner and outer wrappers, together with the article to be wrapped to the wrapping mechanism simultaneously, so that both wrappers are folded about the article at the same time and by the same wrapping mechanism.

In the construction herein illustrated, the water-proof paper, preferably waxed-paper, is taken from a roll of paper and is cut or severed in pieces of the desired length to correspond with the individual outside wrappers and both wrappers are, in the appropriate time in the operation of the machine, placed in position to be thereafter delivered, together with the article to be wrapped, to the wrapping mechanism. The outside wrappers are preferably cut to the required size before being placed in the machine, and are held in a suitable magazine from which they are adapted to be stripped or withdrawn, one at a time as they are required and fed into the path of the articles to be wrapped.

Inasmuch as the machine herein illustrated has been designed for the purpose of wrapping gum, the article to be wrapped will hereinafter be referred to as gum, but it is to be understood that the machine, organized as shown, may be employed for wrapping other articles.

The machine shown is designed for wrapping square pieces of gum, but it is to be understood that the only change required to wrap gum of other shapes will be changes in the relative proportions of the parts and the principle of operation remains the same.

As shown in the drawings, A designates a hollow cast-metal column or base on which the machine proper is supported, and $A^1$ $A^2$ designate vertical, laterally separated side plates or frames upon which the principal parts of the mechanism are mounted.

B designates the vertical chute into which the gums are placed in superposed order and said chute is supported on a shelf or ledge $A^3$ that extends laterally outwardly from the frame plate $A^1$ of the machine (Figs. 1, 9 and 10). The shelf is provided in its top with a groove $a$ (Figs. 9 12 and 13) which constitutes a feed slot through which the gums are delivered from the feed chute to the wrapping mechanism and a portion of which constitutes the bottom of said chute. The top wall of the front part of the chute comprises a horizontal plate $a^1$ (Fig. 9). D designates a feed bar which reciprocates through said slot and through the bottom end of said chute. Said feed bar D has a long range of movement and is adapted in each operation of the machine to pass entirely backwardly so as to bring the end of the bar in rear of the column of gum, and in the forward reciprocation of the bar the bottom gum which at this time rests in the feed slot is forced forwardly to the wrapping mechanism. The means for giving reciprocation to said feed bar is made as follows: $D^1$ designates a block attached to the rear end of the feed bar, and said block is apertured to fit over and slide endwise of a horizontal guide rod $D^2$ that is fixed at its rear end in a bracket $a^2$ of the frame plate $A^1$ and at its forward end to a bracket or sleeve $a^3$ of the shelf $A^3$ (Fig. 9). $D^3$ designates a vertically swinging lever that is fixed at its lower end to a rock-shaft $D^4$ mounted horizontally in the frame of the machine, and said lever is forked at its upper end and connected by means of links $d$ $d$ (Figs. 2 and 9) with oppositely extending studs $d^1$ $d^1$ on said sliding block $D^1$. With this construction the swinging of the lever $D^3$, due to the action of the rock-shaft $D^4$, communicates rectilinear motion to the block $D^1$, and an appropriate reciprocatory motion to the feed bar D. The rock-shaft $D^4$ is rocked by the following mechanism from the main shaft E of the machine; (Figs. 2 and 11). Said main power shaft is provided with the usual fast and loose pulleys and with a pulley $e$ adapted to be connected by a belt $E^1$ with a pulley or disk $E^2$ that is fixed to a counter-shaft F mounted transversely in the frame members $A^1$ $A^2$. Said disk $E^2$ is connected by a piston rod or link $E^3$ with an arm $d^2$ rigid with the rock-shaft $D^4$. With this construction, therefore, the feed-bar is reciprocated forwardly and backwardly during each rotation of the pulley $E^2$.

Next referring to the folding mechanism and means for feeding to said folding mechanism the wrappers of appropriate size simultaneously with the gum, said parts are made as follows: G designates, as a whole, a horizontal magazine for the wrappers, cut to appropriate dimensions. Said magazine comprises a bottom wall $g$ and side walls $g^1$ $g^1$. When wrapping square gums the cut wrappers are square as shown in Fig. 4. The said cut wrappers are pressed tightly in said magazine between a follower $G^1$ at the rear of the same and two rollers $g^2$ $g^3$ at the forward end of the magazine carried by a frame consisting of vertical end portions $g^4$ and a horizontal connecting bar $g^5$. The said frame is pivoted in any suitable manner to the side members of the magazine and in line with the axis of the upper roller $g^2$ against which the principal pressure transmitted through said wrappers is brought. The hinged frame is provided at the sides thereof with laterally extending apertured lugs $g^6$ which engage guide studs $g^7$ projecting inwardly from the side members of the magazine as shown in Fig. 4. Spiral springs $g^{10}$ (Figs. 4 and 6) surround said studs and are interposed between the side frame members and the lugs $g^6$ to hold the lower roller out so as to permit the wrapper at the forward end of the magazine to assume the form shown in Fig. 9, and for another purpose hereinafter to appear. The said magazine, as a whole, is mounted so that its forward end may be tilted upwardly, as indicated in dotted lines in Fig. 1, to afford access to the inner end of the magazine and to the adjacent stripper roller, and other parts, as will hereinafter more fully appear. For this purpose, the bottom wall of the magazine is provided with downwardly projecting lugs $g^8$, (Figs. 1 and 9), hinged to the adjacent frame plate $A^1$ by means of a pivot stud $g^9$. The follower plate $G^1$ may be pressed upon the group of wrappers in the magazine by gravity or spring-pressure. As herein shown, gravity acting means are employed consisting of a lever $G^4$ (Figs. 1, 2, 3 and 11) hinged at its lower end to the power shaft E, a link $G^5$ connecting the upper end of the lever with the follower plate $G^1$, and a weight arm $G^6$ rigidly connected with the lever $G^4$ and acting to throw the follower forwardly. The lower wall of the magazine is ribbed in order to minimize friction between the same and the lower margins of the wrappers.

Formed between a depending flange A⁴ on the inner end of the shelf A³ and a block H and in front of and attached by pins $h$ $h^1$ to the flange A⁴ is a recess $a^4$ which receives the cut wrappers separately preparatory to delivering the same, together with a gum, to the wrapping mechanism, (Figs. 5 and 9). The upper and lower pairs of pins $h$ $h^1$ are spaced laterally apart a sufficient distance to permit the cut wrappers to pass from the magazine between same. Said wrappers, which are designated as X, are delivered in any suitable manner in the said recess and are arrested by means of stops $h^2$ $h^2$ (Figs. 4 and 5) which are fastened to the lower pins $h^1$ by which the block H is attached to the flange A⁴. Said stops are made of wire and depend into said recess from the pins $h^1$, and their terminals are turned forwardly and extend across the recess so as to arrest the wrapper with its upper part in the path of a gum that is pushed from the feed slot to the wrapping mechanism, as hereinafter described.

The means herein shown for stripping the front wrapper off the bundle of wrappers in the magazine and depositing the same in the recess $a^4$ in the path of the gums, is made as follows:—I designates, as a whole, a roller which is located in line with and at the inner end of the magazine. It is fixed to the rotative shaft F carrying the belt-pulley E² before referred to. The roller is reduced in diameter at its central part, thereby providing a deep annular groove in the face thereof for a purpose hereinafter to be described, in connection with mechanism for applying an inner, as well as an outer, wrapper. The peripheries of the larger ends of the roller are provided with curved segmental gripping surfaces $i$ $i$ which, as herein shown, are made of rubber. Said gripping surfaces extend slightly radially outwardly from the general circumferential line of the roller. Preferably the remaining portions of the periphery of the roller at the larger end portions are made of metal (Figs. 9, 10 and 12). As herein shown, the curved strips of gripping material, as rubber, are fastened to or vulcanized on metal segments $i^1$ which are fastened in suitable recesses in the peripheries of the roller in any convenient manner. This construction renders the removal and replacement of the rubber an easy task. The roller I is made of such diameter at its ends that the plain or metal periphery thereof does not come in contact with the wrappers held in the magazine but only the gripping surfaces $i$ come in contact therewith and strip the wrappers one by one therefrom. The inner end of the magazine is located immediately over the recess $a^4$ which receives the wrappers as they are stripped or wiped off from the bundle in the magazine by the gripping surfaces in the roller I. When a wrapper has thus been delivered into the recess $a^4$, resting at its lower edge upon stops $h^2$, it is ready to be delivered, together with the gum, into the folding mechanism, and to be thereafter automatically folded about the gum.

In order to prevent two or more wrappers being stripped from the bundle of wrappers at a time, I provide metal plates G² G², (Figs. 4 and 6) which are attached to the upper front ends of the magazine structure by screws or the like, and project inwardly over the upper corners of the forwardmost wrappers. The inner ends of said plates are made sharp and are inclined both laterally and vertically so as to press or confine the upper corners of the forwardmost wrappers, as shown in Figs. 4 and 6. I have found that the plates G², located and arranged in the manner described, effectively prevent two or more wrappers from being stripped or wiped out of a magazine at one time, the oblique edges of the plates serving to restrain tendency of a wrapper in rear of and in contact with the wrapper being removed from following the front wrapper.

The construction of the folding mechanism and the operation whereby said folding operation takes place, will now be explained. Formed between the upper flat face of the block H and the lower face of the bottom wall of the magazine, is a folding slot or way $h^3$ located in line with the feed bar D, said slot being made deeper than the feed slot or way through which the gum is delivered to the folding mechanism (Figs. 12, 14 and 15). The top wall of said folding slot $h^3$ is provided with depending flanges $h^4$, constituting the side walls of the feed slot, and said side walls terminate above the bottom wall of said slot so as to form longitudinal openings in the sides of said slots. Assuming now that a wrapper X be supported in said recess $a^4$ in the path of movement of the feed bar D and gum, as shown in Fig. 14, the first operation of folding will be as follows: It will be noted that Fig. 14 includes a second or inner wrapper, hereinbefore referred to, but inasmuch as the application of such second wrapper may or may not constitute a feature of the wrapping, the means of applying the inside wrapper will not be described until the operation of applying the outside wrapper X is understood.

In Fig. 14 is shown the position of the parts when the feed bar D is advancing a gum through the feed slot or way. Continued forward movement of the feed bar acts to bring the forward edge of the gum against the wrapper and to fold said wrapper at the line of contact, the wrapper being thereafter carried with the gum into the folding slot (Fig. 15) to form the first side fold, indicated also in Fig. 20. The continued advance movement of the feed bar brings the advance margin of the partially wrapped gum into gripping engagement with gripper fingers or dogs $j\ j$ carried by the head $j^1$ of a vertically swinging lever J that is fixed to a rock-shaft $J^1$ which has suitable bearing in the side plate $A^1$ of the machine base. The top of the head of the lever J is in line with the bottom of the folding groove $h^3$ and the dogs normally stand a distance above the top of the head to constitute between the gripping ends of the dogs and head a notch which receives the advance side of the gum, as mentioned. The said dogs are backed by spiral expansively acting springs $j^2$ (Fig. 9) located in recesses in the rear end of the head and bearing upon the tails $j^3$ of the dogs, whereby the gum is gripped with a spring-pressure and the partially wrapped gum is grasped sufficiently to retain the same upon the head of the folding lever J, in the subsequent movements of the latter. Said feed bar D is thereafter quickly retracted leaving the gum and partially wrapped wrapper on the head, the free or unwrapped margin of the wrapper lying upon the flat upper face of the block H, as shown in Fig. 9.
After said feed bar has been retracted from its forwardmost position, the lever J is swung inwardly, and during the downward swing of the lever the free or unfolded side of the wrapper is folded upon the gum between the head and the curved rear surface $h^{40}$ of the block H. In Fig. 16 is shown the beginning of the swing of the arm J and its effect to fold the second fold of the wrapper. In Fig. 21 is indicated the wrapper and gum after the second fold is completed. In order to facilitate the passage of the free margin of the second fold of the wrapper about the upper acute corner of the block H, without breaking or crumpling the wrapper, the lower wall of the magazine is shown as provided with a downwardly opening notch $g^{10}$ through which the margin of said second fold swings upwardly in the beginning of the folding movement of the arm J. During the time the partially folded wrapper and gum are occupying the folding slot $h^3$, the end folds of the wrapper are projecting through the slots formed between the lower margins of the side walls $h^4$ of said slot and the bottom of the slot. The means for rocking said shaft $J^1$ whereby said folding lever J is thus swung inwardly, is shown more clearly in Figs. 2, 7 and 9 and is made as follows: Said rock-shaft $J^1$ is provided with a rigid arm $J^2$ which is loosely connected with one end of a link $J^3$ that is connected at its other end with a crank-arm $J^4$ fixed to the rock-shaft $D^4$.

After the two side folds of the wrapper have been folded in the manner described, the end folds are folded inwardly together into the position shown in Fig. 22. This is effected by the following mechanism: The folding arm J delivers the gum with the two sides of the wrapper folded thereon into a slot $k$ directly below the lower end of the curved face $h^{40}$ of the block H, and formed between a vertical plate and a parallel plate or apron $K^1$ which is attached at its upper end to the inner face of a block $K^2$ (Figs. 9 and 16) attached to and extending inwardly from the lower end of the flange $A^4$ of the shelf $A^3$. The upper end of the plate K is forked and the outer end of the head of the folding lever J passes between the fork arms $k^1$ to deliver the partially wrapped gum into said slot. Said arms $k^1$ are made of angular shape in cross-section, as shown in Figs. 17 and 18, and the forwardly extending flanges $k^2$ of said fork arms are cut away or curved at their upper ends so as to deflect the end folds of the wrapper to a position at right angles to the gum, which position they occupy when passed downwardly into said slot $k$, as indicated in Fig. 17; the said figure illustrating in full lines the starting inwardly of the end folds by contact with said upper curved ends of the flanges $k^2$ and in dotted lines the completion of the right angle bend. Such turning in of the end folds is made preparatory to the completion of the folds by horizontally swinging folding arms L L provided at their forward ends with wide folding fingers $l$ attached to the arms by yielding or spring connections $l^1$. The said arms are located each with its forward end at one side of the plate K, and said arms are pivoted upon vertical studs $L^1\ L^1$ attached to and rising from the top wall of the base beneath the folding lever J. Said arms are placed under the influence of spring $l^2\ l^2$, wrapped about said posts or standards $L^1$, and bearing at their ends upon the tails of said arms in a manner tending to throw the free ends of the arms together and thereby fold the end folds of the wrapper flat on the package. Said arms are normally held out of their folding positions by means of a suitable vertically oscillatory cam $J^5$, located above and between said arms and, as herein shown, is made a part of the folding lever J. Said cam $J^5$ is thickened at its rear end and is made thin at its forward end (Figs. 7 and 9). The folding arms are provided with vertical roller bearings $l^3\ l^3$ adapted to engage the side faces on said cam. When the cam is in position for engagement of the thicker end thereof by said bearing rollers, the folding arms are held apart at their forward ends, and when the roller bearings engage the thinner ends of the cams the forward ends of the arms are brought together by the springs $l^2$ in a position to engage the end folds of the wrapper and to fold the latter inwardly, as indicated in Fig. 18.

In order to facilitate the turning of the end folds inwardly, means are provided for crimping the wrapper at the beginning of the turning movement of the end folds. This may be conveniently effected by means of spring-pressed fingers $k^3$ $k^3$ which are pressed into the angles of the arms $k^1$ of the guide plate K and in contact with which the end folds of the wrapper pass when being inserted in the grooves $k$. Said crimping fingers $k^3$ are shown as attached to short spring-pressed dogs $k^4$ $k^4$ hinged to the side faces of the folding block H, as shown in Figs. 9 and 19. The spring mounting on said dogs $k^4$ and fingers $k^3$ permits the end folds of the wrapper to pass freely into the upper end of the slot $k$, and said fingers press against the bases of the end folds to crimp the same and facilitate the starting of the fold. The gums are delivered with their upper margins below the lower ends of the dogs and said dogs, therefore, prevent the gums being withdrawn from the slot $k$ when the folding lever is swung upwardly. It is desirable to curve the creasing fingers $k^3$ in the manner shown in Fig. 9 inasmuch as it gives a tendency for the corners of the end folds to turn inwardly so that when said end folds are folded flat upon the side folds of the wrapper, they are entirely within the limits of the margins of the package. Each gum and its partially folded wrapper is carried by the folding arm J into the upper end of the slot $k$ (see dotted lines Fig. 9) and the arm or lever is swung backwardly. The next gum delivered by said arm into the slot pushes in the upper end of the slot to the lower end thereof and the end folds of the wrapper are wrapped in the second position of the gum. Thereafter the completely wrapped gum is forced downwardly by the gum in rear of it in position to be discharged from the machine. Thus the gums are advanced through the slot $k$ to the discharging device by the action of the folding lever J and the interposed partially wrapped gums. It will be observed that the end folds of the wrapper are folded around or outside of the apron or plate $K^1$ constituting the forward wall of the guide slot $k$. It is also desirable that the bases of the end folds should not pass out of the influence of the creasing fingers until the wrapper is completely folded, and to this end supplemental creasing fingers $k^8$ are provided which extend in line with the fingers $k^3$ and are attached to the side faces of the block $K^2$, as clearly shown in Figs. 9 and 19. The apron or plate $K^1$ and the supplemental creasing fingers $k^8$ are made thin so that when the folded package is forced downwardly off said parts the end folds lie close against the side and ends of the package.

In the practical operation of a machine of this character it is desirable that the gums, after being wrapped, shall be discharged from the machine in groups of a prescribed number, and a grouping and discharge mechanism is herein provided for that purpose. When wrapping gums in the manner herein shown, it is also desirable that the gums of each group (five being herein shown) shall be so arranged that the plain faces of the wrappers of the two outside gums shall face outwardly. In order to effect this result it is necessary to turn the last gum of each group before it is nested in the group. This operation is herein shown as effected by means of a suitable turn-table mechanism through which the wrapped gums are discharged, after being folded, and before they are grouped, and said turn-table is actuated to rotate when the last gum of each group is contained therein.

The mechanism herein shown for effecting the turning of the last gum of a group is made as follows: M designates the turn-table referred to which rotates about a vertical axis and is provided with a slot $m$ extending across its central axis and which is normally located in line with and constitutes an extension of the slot $k$. Said turn-table has rotative bearing in a vertical, cylindric opening of a base casting $M^1$ of suitable form attached to the top of the machine base, and formed to provide beneath the turn-table a space $M^3$ which receives the gums as they are discharged from the slot $m$. The wrapped gums are forced through the slot $m$ by the gums which follow the same through force exerted by the folding lever J. Said turn-table is rotated through a half-turn at the appropriate times in the operation of the machine through the medium of a horizontal rack bar N which has suitable bearing in a guide-way in the upper part of the cast base and engages cogs or teeth on the upper end of the turn-table. Said rack bar as well as the turn-table are held vertically in place by means of a thin plate $m^1$ which is attached by screws or the like to the top of the turn-table casting, as shown in Figs. 7 and 9.

The rack-bar is reciprocated through the medium of a suitable cam operating mechanism, which is herein shown as made as follows:—O designates a cam wheel mounted on a horizontal shaft $O^1$ and provided with a peripheral cam track $o$ and with a circular series of gear teeth $o^1$. Said wheel is rotated by intermeshing engagement of said gear teeth $o^1$ with a pinion $f$ (Figs. 2 and 11) on the rotary shaft F. The said cam track or groove $o$ is engaged by a cam stud $n$ that rises from a horizontally swinging lever $N^1$ which is pivoted at the rear end of the machine to a standard or post $n^1$ and is loosely connected at its other end with an extension or arm $N^2$ of the rack-bar N. The cam slot is so formed that the rack-bar is shifted endwise, and the turn-table rotated through a half-turn once during the delivery of the number of gums constituting a group, and is shifted to reverse the rotation of the table through a half-turn at the time the slot $m$ thereof contains the last gum of the next group, and so on.

In order to insure that the turn-table shall always stop with the slot $m$ thereof in alinement with the slot $k$, notwithstanding slight wear of the operating parts, the said turn-table is flattened on its opposite sides, as shown at $m^2$, in Fig. 9, and said flattened sides of the turn-table are adapted to be engaged by one arm $m^{20}$ of a U-shaped spring $M^4$, the other arm $m^3$ of said spring being attached to the bearing casting of the turn-table, as shown in Fig. 7. Said spring is of such strength that it brings the table to the same stopping position after each half rotation thereof in case the looseness of the operating mechanism stops the table with its slot out of line with the slot $k$.

The wrapped gums after having been forced through the slotted turn-table into the receiving space or chamber $M^3$ are at one side of a laterally directed discharge chute P which is supported on the top of the base in any suitable manner and extends laterally therefrom a distance to discharge the group of gums clear of the machine. Said chute is of channeled form, it being open at the top. It is provided with a lateral opening in line with said receiving space $M^3$ below the turn-table, said lateral opening of the chute having parallel side walls $p$ which constitute also the side walls of the space or recess $M^3$. The gums are delivered one by one to said chute as they are discharged into said space $M^3$ until a required number to constitute a group have been brought together side by side in the chute, whereupon the group of gums is advanced outwardly a distance through the chute toward the discharge end thereof. The inner end of said chute constitutes, therefore, an assembling chamber in which the gums are assembled in groups of a prescribed number of gums in each group.

Next describing the means for transferring the gums one by one from the space $M^3$ to the chute, said parts are made as follows: Q designates a push-bar which is provided at its inner end with a plate or head $Q^1$ (Figs. 7, 8 and 9) that is adapted to reciprocate across the space $M^3$. The push-bar has slotted connection at its other end with the extreme end of the horizontal rock-shaft $D^4$ by means of a suitable stud $q$. Said push-bar is operated, as herein shown, from the lever $D^3$, the operative connection being a cam stud $d^5$ on said lever $D^3$ which engages a cam slot $q^1$ in the enlarged end of said lever Q. The cam slot $q^1$ is made of such shape that the push-bar travels inwardly during only a portion of the inward swing of the lever $D^3$. During the remainder of the swing of the lever $D^3$, the stud $d^5$ is traveling in a concentric part of the slot, thereby giving no movement to the push-bar. Located at each side of said head $Q^1$ in the space $M^3$, below the turn-table, are upper and lower pairs of hinged dogs $M^6$ (Figs. 8 and 9). Said dogs are hinged to vertical pins $m^5$, each pin constituting the hinge for the two upper and lower dogs at one side of the space $M^3$. The forward ends $m^6$ of said dogs are curved inwardly and are located a distance apart less than the width of a gum so as to prevent a gum falling laterally into the chute when discharged from the turn-table. The push-bar head $Q^1$ prevents the gums from falling in the opposite direction. Said dogs are normally held with their hooked ends close together by means of spiral contractile springs $m^7$ extending between and attached to the dogs of laterally opposing pairs. When the push bar head is forced toward the chute P to deliver a gum laterally into said chute, said dogs are spread apart to permit the gum to pass freely therethrough. $P^1$ designates a swinging presser bar which is pivoted at one end to an inward extension of the discharge chute (Fig. 8) and is held spring-pressed at its other or free end $p^1$ against the gums as they are forced laterally into said discharge chute. Said presser bar acts to hold the gums of a group flatwise together between the same and the ends of the dogs $M^6$, and thereby hold the gums of a group compactly together.

When a required number of gums have been delivered to the discharge chute to constitute a group, mechanism is set in operation for forcing the group a distance through the chute toward the discharge end thereof and laterally out of the path of the gums of the next group entering the chute. The mechanism for effecting this result is shown more clearly in Figs. 3, 4 and 7, and is made as follows: $P^2$ designates a horizontal reciprocating ejector bar located in line with the discharge chute P and is operatively connected with the cam wheel O, as shown in Fig. 4. To this end said cam wheel is provided with a second cam groove $o^2$ which is engaged by a roller bearing stud $p^4$ rising upwardly from a lever $p^5$ that is pivoted at one end to a post or standard $p^6$ rising from the top of the base, and is connected at its other end with the ejector bar by a pin and slot connection as shown in Fig. 7. The ejector bar $P^2$ is provided at its forward end with a suitable head $P^3$ which slides outwardly through said discharge chute P below the presser bar P¹ and at the appropriate time in the operation of the machine, that is to say, when a group of gums of the desired number has been transferred laterally into said chute, said ejector mechanism is operated to advance the group of gums along the discharge chute. The groups of gums fit snugly between the side walls of said chute, and, as each new group begins its travel toward the discharge end of the chute, it pushes outwardly all of the groups of gums before it. An attendant stands at the discharge end of the chute and receives each group of gums as it is discharged therefrom and confines the same, as by an elastic band or otherwise, to hold the gums properly in place.

The improvements so far described relate only to the mechanism necessary for wrapping a single wrapper about the gum. I will now describe the additional mechanism required for applying an inner or waterproof wrapper, usually made of wax paper. In this instance the inner wrapper is supplied from a roll R supported on a standard R¹ rising from the side plate A¹ of the machine, as shown in Fig. 3. The strip of paper is directed from the roll through a guide b on the feed chute B, (Figs. 1 and 11) and through another guide A⁵, (Figs. 9 and 12) provided also for another purpose as hereinafter described. From the guide the strip of paper is directed between the central smaller part of the wrapper stripping roller I and a metal roller S, (Figs. 9, 12 and 13) which coöperates with the smaller diameter of the roller I and is fixed to a shaft S¹ that is mounted in brackets B³ extending forwardly from the feed chute B. The roller S, is rotated through the medium of intermeshing gear wheels S² and I¹ on the shaft S¹ and the shaft F, respectively, (Fig. 10), the shaft F being the driving shaft. From the continuous strip of paper pieces of appropriate length are cut, while passing between the rollers I and S, to constitute the inner wrappers, designated as X¹ in Figs. 14 and 15. Said cut inner wrappers are delivered to the recess a⁴, as shown in Fig. 14, generally parallel with the outer wrapper X and inasmuch as the gum first strikes the inner wrapper just before it is forced into the folding slot h³, the two wrappers are folded along the same horizontal line, with the wrapper, and in the subsequent folding operations the folding of both wrappers is essentially the same as the folding of a single wrapper.

Referring now to the means for cutting the inner wrappers from the continuous strip of paper and for guiding the cut wrappers into the recess a⁴, said mechanism is shown more clearly in Figs. 1, 9, 12 and 13 and is made as follows: Said roller S carries a knife S³ which is fixedly seated in a radial slot of the roller and projects at its sharpened margin beyond the roller. Said knife is adapted to register with and enters once during each rotation of the roller S a longitudinally disposed slot i⁹ formed in the periphery of the smaller part of the roller I (Figs. 9 and 12). In order to insure the proper cutting of the paper by the knife S³ entering the notch in the manner described, the roller S carries spring-pressed gripping bars S⁴ S⁵ which occupy longitudinal recesses in the roller S and are normally projected beyond the cylindric circumference of the roller by springs s s¹ located between the inner ends of the bars and the bottoms of the recesses in which they are contained. As herein shown, said bars and the knife are fastened in place by means of screw-studs S⁶ (Figs. 9 and 12) which extend through registering openings in the presser bars and knife and have screw-threaded engagement with the roller. The screw-studs S⁶ fit tightly in the openings of the knife but pass through guide slots in the gripping bars, whereby said bars are free to move inwardly and outwardly. Said bars are normally projected from the cylindric surface of the roller, as shown in Fig. 9, and when brought into contact with the roller I retire into their recesses, as shown in Fig. 12. This arrangement of the gripping bars S⁴ S⁵ is such that they bear with sufficient pressure against the strip of paper passing over the smaller part of the roller I, at the time the knife enters the notch i⁹, as to hold said strip from slipping on the roller.

The strip of paper, or the inner wrappers cut therefrom, are directed after leaving the rollers to the recess a⁴ through a curved space between the smaller part of the roller I and a guide block I² fixed to the cross-bar g⁵ of the frame carrying the rollers g² g³ at the front end of the magazine, and said block is provided with a rearwardly facing curved surface corresponding with the curvature of the smaller part of the roller I, as shown in Figs. 4 and 12 and is adapted to bear against a raised portion of the smaller part of the roller I, such raised portion or increased diameter being located between the points i¹¹ i¹¹ (Fig. 12). Attached to the block I² is a spring I³ (Fig. 12) which is turned rearwardly at its lower end to form a curved bearing shoe i¹⁰ (Figs. 4 and 12) which is adapted to bear at all times against the cylindric face of the reduced part of the roller I, or the inner wrapper passing between the roller and said bearing shoe for a purpose hereinafter to be described.

In order to prevent the advance end of the strip, after an inner wrapper has been cut therefrom, from clinging to and following the roller I, the reduced part of the roller is provided with circumferential grooves into which enter the upper ends of guard rods $I^5$ $I^5$ which are curved at their upper ends to conform to the curvature of the roller, and are straight at their lower ends to guide the paper or wrapper to the recess $a^4$ (Figs. 5, 9 and 12). Said guard rods are attached at their lower ends to a short vertical flange $a^6$ rising from the plate $a^1$ that constitutes the upper wall of the inner end of the feed slot. The reduced part of the roller I is formed with a rubber or other suitable gripping surface which coöperates with the roller S, as before described, to insure the feeding of the paper between said rollers and the proper feeding of the wrappers between the roller and the shoe $i^{10}$. A preferred form of the roller I is herein shown (Figs. 5 and 13) wherein the reduced part thereof is made up of alternate disks of metal and rubber $i^3$ $i^4$ and the peripheries of the metal disks $i^3$ are provided with the annular grooves which receive the guard rods $I^5$ before referred to. The construction of said roller embodying said alternate rubber and metal disks and also the enlarged end parts is such as to permit the roller to be readily dismantled and assembled for the purpose of renewing the rubber gripping surfaces. To this end one end of the larger part of the roller consists of a disk $i^5$ provided with a sleeve $i^6$ fitted to the shaft F and the other end of said sleeve is fixed to the other larger end $i^7$ of the roller I. The alternate metal and rubber disks $i^3$ $i^4$ are mounted on said sleeve $i^6$ and confined between the larger end portions $i^5$ $i^7$ of the roller, and the parts are clamped together to constitute a unitary structure by means of bolts or rivets $i^8$ (Fig. 13). The metal disks $i^3$ of said roller I protect the rubber face or surface of the roller from being injured by contact thereof with the gripping bars $S^4$ $S^5$.

The inner wrapper $X^1$ is made narrower than the outer wrapper, as shown in Fig. 20, and a stop $h^5$ is provided within the recess $a^4$ between the stops $h^2$ for the outer wrapper against which the lower margin of the inner wrapper is brought as it falls in the recess and by which said wrapper is arrested in the path of the gum as it passes to the folding mechanism.

A suitable brake is provided for engaging the strip of paper between the roll R, from which the paper is unwound, and the rollers I and S for the purpose of holding the strip of paper from movement except when drawn forwardly between the rollers S and I for the distance necessary to produce an inner wrapper of the required length. Said brake also conveniently serves as the guide $A^5$, before referred to.

The parts of the device constituting the brake are made as follows: Fixed in the top of the post constituting part of the guide $A^5$ is a block of rubber $a^7$ or other suitable gripping material over which the strip of paper passes. $A^8$ designates a shaft having a downwardly facing flattened surface located above and coöperating with said rubber block $a^7$, as shown in Figs. 9 and 12. When the shaft is in the position shown in Fig. 12, the strip of paper is free to pass between the flattened face of the same and the rubber, but when the shaft is depressed the paper is clamped between its flat face and the rubber, thus constituting a brake to arrest its advance movement. The means for actuating said shaft to depress the same consists of a cam T mounted on the shaft F laterally outside of the roller I (Figs. 1 and 13) and engaging a vertically swinging lever $T^1$ hinged to a stud $t$ fixed to the frame of the machine. Said lever is spring pressed upwardly toward the cam and is provided with a vertical arm to which the outer end of the brake shaft or rod $A^8$ is attached. With this construction, the brake rod or shaft $A^8$ is depressed to pinch the strip of paper between the same and the block $a^7$ during a portion of the rotation of the roller I and during the remaining portion of the rotation of said roller the actuating spring of the lever $T^1$ raises the brake rod out of its operative position and permits the paper to pass freely between the breaking elements.

The operation of feeding the strip of paper to the rollers S and I and cutting the inner wrappers therefrom is as follows: After an inner wrapper has been cut or severed from said strip, said wrapper is advanced to the recess $a^4$ between the reduced part of the roller I on the one hand and the guide block $I^2$ and shoe $i^{10}$ on the other hand, said guide block coacting with the raised part of the periphery of the reduced portion of the roller and the shoe bearing continuously against said part of the roller. The advance end of said strip, after a wrapper has been severed therefrom is delivered between the roller I and the block $I^2$ in the following manner. At the time an inner wrapper is severed the advance end of the strip is held or confined between the raised part of the periphery of the central part of the roller I and the presser bar $S^4$ and as the rollers rotate in the direction indicated by the arrows in Fig. 12 and carry the knife away from the roller I the presser bar $S^4$ is forced out of its recess in the roller S with its lower margin pinching the advance end of the strip against said roller, thus maintaining said advance end of the strip pressed flat upon the periphery of the roller I. Said presser bar $S^4$ remains in engagement with the advance end of the paper strip, during the rotation of the roller S until said bar is brought closely adjacent to, but not in actual contact with, the rear end of the guide block I². Said guide block is provided at its rear end with a central projection $i^{15}$ and the presser bar S⁴ is provided with a central recess $s^5$ (Fig. 12) located in alinement with and adapted to pass over said projection. The advance end of said sheet of paper is thus delivered to and passed under the rear end of said guide block I². During this operation the roller S is bearing against the raised periphery of the reduced portion of the roller I thus acting in conjunction with the presser bar S⁴ to feed the strip forwardly between the rollers. As soon as the advance end of said strip has been delivered beneath the guide block I² the pressure of said block on the raised periphery of the roller I serves to feed the strip forwardly and to carry it between the shoe $i^{10}$ and the roller and as said shoe bears at all times against said roller the advance movement of the strip continues until arrested by the brake device heretofore described. The pressure of the block I² against the raised periphery of the reduced central part of the roller I and of the shoe $i^{10}$ against the roller is regulated by the springs $g^{10}$ which force rearwardly the frame carrying said block, said springs being shown in Fig. 4. Said brake action is brought into effect when a proper length of the strip is fed forwardly to produce an inner wrapper. Such brake action on the strip continues (which is effected by the proper timing of the brake actuating cam T) until the knife S³ is brought in position to cut another inner wrapper from the strip, whereupon the brake is released, the cut wrapper delivered to the recess $a^4$ and the advance end of the strip again passed between the guide block and roller I, as before described.

I claim as my invention:—

1. In a wrapping machine, means for advancing the gum, means for delivering a wrapper across the path of the gum, whereby the gum strikes the wrapper edgewise and effects the first side fold of the wrapper about the advance side of the gum, a forwardly and downwardly swinging arm to which the partially folded gum is delivered when the arm is in its rearmost position, means coöperating with said arm operating during the forward swinging of the arm to fold the other side of the wrapper about the gum, and means for effecting the end folding of the wrapper.

2. In a wrapping machine, a wrapping mechanism embracing two folding slots located at an angle to each other, means for delivering a wrapper together with the gum to the first slot to effect a partial side wrapping of the gum, a swinging arm which receives the partially wrapped gum operating to reverse the direction of movement of the partially wrapped gum to transfer said partially wrapped gum to the second folding slot, means between said slots operating during said transfer movement to complete the side wrapping, and means operating when the gum occupies the second slot to fold the end folds of the wrapper.

3. In a wrapping machine, a wrapping mechanism embracing two folding slots located at an angle to each other, means for delivering a wrapper together with the gum to the first slot to effect partial side wrapping of the gum, a swinging arm which receives the partially wrapped gum operating to reverse the movement of the partially wrapped gum and deliver it to the second folding slot, means between said slots operating during the transfer of the gum and wrapper to complete the side wrapping thereof, and folding fingers movable toward and from each other and adapted to engage the end folds of the wrapper when the gum and wrapper occupy the second folding slot to fold said end folds.

4. In a wrapping machine, a wrapping mechanism including a folding slot, means for delivering a wrapper in front of the slot, means for feeding the gum edgewise against the wrapper and into said slot to effect the first fold of the wrapper about the advance side of the gum, means for reversing the travel of the gum to effect the folding of the other side of the wrapper between the gum and a part on the machine toward which the gum travels in its reverse movement, said folding slot being provided in its upper wall with a recess which permits the last folded side to swing upwardly during the folding process, and means thereafter folding the end folds of the wrapper flat against the package.

5. A wrapping machine embracing a wrapping mechanism including a folding slot, means for delivering a wrapper in front of the slot, means for feeding a gum edgewise against the wrapper and into said slot for effecting the first fold of the wrapper about the advance side of the gum, a swinging arm for reversing the direction of travel of the partially wrapped gum to effect the folding of the other side of the wrapper between the gum and a part on the machine toward which the arm swings to reverse the gum, and end folding fingers controlled by the movement of said swinging arm for operating said end fold fingers.

6. A gum wrapping machine comprising means for feeding the gums edgewise one at a time, means for delivering the wrappers across the path of the gums whereby the gums strike the wrappers edgewise and effects the first side fold of the wrappers about the advance sides of the gums, means for folding the wrappers about the other sides of the gums, means for wrapping the end folds of the wrappers flat against the side of the package, and means for crimping the bases of the end folds of the wrappers preparatory to the final folding of the same.

7. A machine for the purpose set forth, comprising a wrapping mechanism including a folding slot, means for delivering wrappers in front of said slot, and means for feeding gums edgewise against said wrappers and into said slot for effecting the first fold of the wrapper about the advance sides of the gums, said wrapping mechanism including also a swinging folding arm provided with a gripping device to which the partially wrapped gums are delivered by said feeding means, and by which the wrapped advanced sides of the gums are gripped, a folding surface on the machine between which and the folding arm the wrappers are folded about the other sides of said gums, and means thereafter acting to fold the ends of the wrappers inwardly against the sides of the packages.

8. A machine for the purpose set forth, comprising a wrapping mechanism including a folding slot, means for delivering wrappers in front of said slot, and means for feeding gums edgewise against said wrappers into said slot for effecting the first fold of the wrappers about the advance sides of the gums, said wrapping mechanism comprising also a swinging folding arm to which the partially wrapped gums are delivered by the feeding means, a folding surface on the machine between which and the folding arm the wrappers are wrapped about the other side of the gums, and folding fingers movable toward and from each other for engaging the end folds of the wrappers to fold the same flat against the sides of the packages.

9. A machine for the purpose set forth, comprising a wrapping mechanism including a folding slot, means for delivering wrappers in front of said slot and means for feeding gums edgewise against the wrappers and into said slot for effecting the first fold of the wrappers against the advance sides of the gums, said wrapping mechanism comprising also a swinging folding arm provided at its upper end with a notch to which the partially wrapped gums are delivered by the feeding means, a folding surface on the machine toward which said lever swings and between which and the arm the second side folds of the wrappers are wrapped about the gums, a guide slot into which the partially wrapped gums are delivered by said folding arm, means for crimping the end folds of the wrappers at the bases thereof, and means acting thereafter for folding said end folds against the sides of the packages.

10. A machine for the purpose set forth, comprising a wrapping mechanism including a folding slot, means for delivering wrappers in front of said slot, and means for feeding gums edgewise against said wrappers and into said slot for effecting the first folds of the wrappers about the advance sides of the gums, said wrapping mechanism embracing also a swinging folding arm to the upper end of which the partially wrapped gums are delivered by said folding means, a folding surface on the machine toward which said arm swings and between which and the arm the second side folds of the wrappers are wrapped about the gums, a guide slot into the upper end of which said partially wrapped gums are delivered by said arm, means for holding said gums in said slot during the retractive movement of the arm, and folding arms for folding the end folds of the wrappers against the sides of the packages.

11. A machine for the purpose set forth, comprising a wrapping mechanism including a folding slot, means for delivering wrappers in front of said slot and means for feeding gums edgewise against said wrappers and into said slot for effecting the first fold of the wrappers against the advance sides of the gums, said wrapping mechanism comprising also a folding arm to the upper end of which partially wrapped gums are delivered by the feeding means, a folding surface on the machine toward which the lever swings and between which and the arm the second folds of the wrappers are wrapped about the other sides of the gums, a guide slot into which said partially folded gums are delivered by said folding arm, spring-pressed crimping fingers located at the upper end of said slot and adapted to crimp the bases of the end folds of the wrappers, and means for folding said end folds together and against the sides of the packages.

12. A machine for the purpose set forth, comprising a wrapping mechanism including a folding slot, means for delivering wrappers in front of said slot, and means for feeding gums edgewise against said wrappers and into the slot for effecting the first folds of the wrappers about the advance sides of the gums, said wrapping mechanism embracing also a folding arm to the upper end of which the partially wrapped gums are delivered by the feeding means, a curved folding surface on the machine toward which said arm swings and between which and the arm the second side folds of the wrappers are wrapped about the gums, a guide slot into which the partially wrapped gums are delivered by said folding arm, two spring-pressed dogs normally closing the upper end of said slot and adapted to swing away to permit the partially wrapped gums to enter the slot, and acting as stops to prevent withdrawal of the gums from said slot in the retractive movement of the folding arm, and means for folding the end folds of the wrappers against the sides of the packages.

13. A machine for the purpose set forth, comprising a wrapping mechanism including a folding slot, means for delivering wrappers in front of said slot, and means for feeding gums edgewise against said wrappers and into the slot for effecting the first folds of the wrappers about the advance sides of the gums, said wrapping mechanism embracing also a folding arm to the upper end of which the partially wrapped gums are delivered, a curved folding surface on the machine toward which said arm swings and between which and the arm the second side fold of the wrappers are wrapped about the gums, a slot into which the partially wrapped gums are delivered by said folding arm, two spring-pressed dogs normally closing the upper end of said slot and adapted to swing away to permit the partially wrapped gums to enter the slot, and acting as stops to prevent withdrawal of the gums from said slot in the retractive movement of the folding arm, crimping fingers carried by said dogs adapted to crimp the wrappers at the bases of the end folds thereof, and means acting thereafter to fold the end folds of the wrappers against the side faces of the packages.

14. A machine for the purpose set forth comprising a wrapping mechanism including a folding slot, means for delivering wrappers in front of said slot, and means for feeding gums edgewise against the wrappers to force the gums and wrappers into said slot for effecting the first fold of the wrappers about the advance sides of the gums, said wrapping mechanism comprising also a swinging folding arm to which the partially wrapped gums are delivered by the feeding means, a curved folding surface on the machine between which and said arm the second side fold of the wrappers are wrapped about the gums during the swinging movement of the arm, folding arms mounted to swing toward and from each other for folding inwardly against the sides of the packages the end folds of the wrappers, and a cam movable with said arm for actuating said end folding arms.

15. A machine for the purpose set forth, comprising a wrapping mechanism including a folding slot, means for delivering wrappers in front of said slot, and means for feeding gums edgewise against the wrappers to force the same and the gums into the slot for effecting the first fold of the wrappers about the advance sides of the gums, said folding mechanism also embracing a swinging folding arm to which the partially wrapped gums are delivered by the feeding means, a curved folding surface on the machine toward which said arm swings and between which and the arm the second side folds of the wrappers are wrapped about the gums, a guide slot to the upper end of which the partially wrapped gums are delivered by said folding arm, the wall of said slot adjacent to the folding lever being provided with right angle flanges which operate, as the wrappers are forced through the slot, to turn the end folds of the wrappers at right angles to the plane of the gums, and folding arms acting against the said end folds of the wrappers for folding the same flat against the sides of the packages.

16. A machine for the purpose set forth, comprising a wrapping mechanism including a folding slot, means for delivering wrappers in front of said slot, and means for feeding gums edgewise against the wrappers, to force the same and the gums into the slot for effecting the first fold of the wrappers about the advance sides of the gums, said folding mechanism also embracing a swinging folding arm to which the partially wrapped gums are delivered by the feeding means, a curved folding surface on the machine toward which said arm swings and between which and the arm the second side fold of the wrappers are wrapped about the gums, a guide slot to the upper end of which the partially wrapped gums are delivered by said folding arm, the wall of said slot adjacent to the folding lever being provided with right angle flanges which operate, as the wrappers are forced through the slot, to turn the end folds of the wrappers at right angles to the plane of the gums, crimping fingers adapted to press against the bases of the end folds of the wrappers in the angles between said plate and flanges, and folding arms acting against the said end folds for folding the same flat against the sides of the packages.

17. A machine for the purpose set forth, comprising a wrapping mechanism including a folding slot, means for delivering wrappers in front of said slot, and means for feeding gums edgewise against said wrappers and to force the same and the wrappers into the slot for effecting the first fold of the wrappers about the advance sides of the gums, said wrapping mechanism comprising also a swinging folding arm designed to receive the partially wrapped gums, a curved folding surface on the machine between which and the arm the second fold of the wrappers are wrapped about the gums, two parallel plates below said folding surface between which is formed a slot to which the partially wrapped gums are delivered by said folding arm, the plate adjacent to the folding arm being provided with a recess to receive the head and being provided at its outer edges with right angle flanges acting against the end folds of the wrappers to swing the same at right angles to the plane of the gums as the gums are forced downwardly into the slot, and folding arms movable toward and from each other and adapted to engage said end folds of the wrappers to fold the same inwardly against the sides of the packages.

18. A machine for the purpose set forth, comprising a wrapping machine including a folding slot, means for delivering wrappers in front of said slot, and means for feeding gums edgewise against said wrappers and to force the same and the wrappers into the slot for effecting the first fold of the wrappers about the advance side of the gums, said wrapping mechanism comprising also a swinging folding arm designed to receive the partially wrapped gums, a curved folding surface on the machine between which the arm and the second fold of the wrapper is wrapped about the gums, two parallel plates below said folding surface between which is formed a slot to which the partially wrapped gums are delivered by said folding arm, the plate adjacent to the folding arm being provided with a recess to receive the end of said arm and being provided at its outer edges with right angle flanges acting against the end folds of the wrappers to swing the same at right angles to the plane of the gums as the gums are forced downwardly into the slot, and folding arms movable toward and from each other and adapted to engage said end folds of the wrapper to fold the same inwardly against the sides of the packages, crimping fingers at the upper ends of said guide slot adapted to crimp the bases of the end folds of the wrappers as they are turned inwardly by said flanges, and supplementary crimping fingers adapted also to engage said end folds during the time the said end folds are being wrapped inwardly against the sides of the packages.

19. A machine for the purpose set forth comprising wrapping mechanism, means for feeding the wrappers and gums to said wrapping mechanism, means whereby the wrapped gums are discharged from the wrapping mechanism through the pressure of the gums which follow, means for assembling the wrapped gums in groups, means for turning certain of the gums of the groups and means for ejecting the groups.

20. A machine for the purpose set forth, comprising wrapping mechanism, means whereby the wrapped gums are discharged from the wrapping mechanism through the pressure of the gums which follow, means for assembling the wrapped gums in groups of a prescribed number of gums in each group, and means for reversing certain gums of the groups.

21. A machine for the purpose set forth comprising wrapping mechanism, means for feeding the wrappers and gums to said wrapping mechanism, means whereby the wrapped gums are discharged from the wrapping mechanism through the pressure of the gums which follow, a stationary assembling chamber in which the wrapped gums are grouped, and means for turning one gum of each group before it is directed to said assembling chamber.

22. A machine for the purpose set forth comprising wrapping mechanism, means for feeding the wrappers and gums to said wrapping mechanism, means whereby the wrapped gums are discharged from the wrapping mechanism through the pressure of the gums which follow, a stationary assembling device in which the wrapped gums are grouped, and a slotted turn-table located between the discharge side of the wrapping mechanism and the assembling device.

23. A machine for the purpose set forth, comprising a wrapping mechanism, means for feeding gums to said wrapping mechanism, means for feeding wrappers to said wrapping mechanism, means for operating the wrapping mechanism for folding the wrappers about the gums, means for discharging the wrapped gums from the wrapping mechanism, a turn table provided with a slot through which the gums are discharged from the wrapping mechanism, means for rotating the turn table, a receiving chamber into which said gums are discharged from said slot of the turn table, a stationary assembling chamber, and means for transferring the gums one at a time from the receiving to the assembling chamber.

24. In a machine for the purpose set forth, a wrapping mechanism, means for feeding the wrappers and gums to the wrapping mechanism and advancing them therethrough, folding means constituting part of the wrapping mechanism for folding the wrappers about the gums as they advance through the wrapping mechanism, said wrapping mechanism embracing a slot through which the gums are discharged from said mechanism by the pressure of the gums next following, a receiving chamber into which the wrapped gums are dropped one by one, an assembling chamber located laterally at one side of the receiving chamber, means for transferring the gums from the receiving to the assembling chamber, and means for turning one gum of each group prior to its delivery to the receiving chamber.

25. In a machine for the purpose set forth, a wrapping mechanism, means for feeding the gums and wrappers to the wrapping mechanism and advancing them therethrough, said wrapping mechanism including folding means located along the path of the gums and wrappers for folding the wrappers about the gums, and including also at its discharge end a slot through which the gums are discharged by pressure of the gums which follow, a receiving chamber into which the wrapped gums are dropped one by one, an assembling chamber, means for transferring the gums from the receiving to the assembling chamber, a turn table provided with a vertical slot located in line with said discharge slot of the wrapping mechanism through which the gums discharged from said wrapping mechanism are passed to the receiving chamber, and means for rotating said turn table.

26. A machine for the purpose set forth, comprising a wrapping mechanism, means for delivering wrappers to said wrapping mechanism, means for feeding gums to said wrapping mechanism, means operating the folding mechanism for folding the wrappers about the gums, a receiving chamber into which the wrapped gums are discharged edgewise, a reversing device between the wrapping mechanism and receiving chamber, a discharge chute, a stationary assembling chamber at the inner end of said discharge chute, means for transferring said wrapped gums from said receiving chamber to the assembling chamber and arranging them side by side therein, and means for ejecting groups of said gums from said assembling chamber through the discharge chute.

27. In a machine for the purpose set forth, the combination of the wrapping mechanism, means for feeding the wrappers adjacent thereto, means for feeding gums adjacent to the wrapping mechanism, means operating the wrapping mechanism to fold the wrappers about the gums, a receiving chamber into which the said wrapped gums are delivered on edge, a reversing device between the wrapping mechanism and receiving chamber, an assembling chamber located at one side of said receiving chamber and opening laterally thereinto, and a push bar reciprocating through said receiving chamber for delivering the wrapped gums from the receiving chamber to the assembling chamber.

28. In a machine for the purpose set forth, the combination of the wrapping mechanism, means for feeding the wrappers adjacent thereto, means for feeding gums adjacent to the wrapping mechanism, means operating the wrapping mechanism to fold the wrappers about the gums, a receiving chamber into which the said wrapped gums are delivered on edge, a reversing device between the wrapping mechanism and receiving chamber, a discharge chute located at one side of said chamber and opening laterally thereinto, the inner end of which constitutes an assembling chamber, a push bar reciprocating through said receiving chamber for delivering the wrapped gums therefrom to the assembling chamber and an ejector for ejecting gums in groups from said assembling chamber to the discharge chute.

29. In a machine for the purpose set forth, the combination of a wrapping mechanism, means for feeding wrappers and gums to the wrapping mechanism and advancing the same therethrough, means operating the wrapping mechanism to fold the wrappers about the gums during the advance thereof through the mechanism, a receiving chamber into which the wrapped gums are delivered on edge one at a time from the wrapping mechanism, a reversing device between the wrapping mechanism and receiving chamber, an assembling chamber located at one side of said receiving chamber and communicating therewith, means for transferring the wrapped gums one at a time from the receiving chamber to the assembling chamber, and means for retaining the gum or gums of an unfinished group on edge during the formation of said group.

30. In a machine for the purpose set forth, the combination of a wrapping mechanism, means for feeding wrappers and gums to the wrapping mechanism and advancing the same therethrough, means operating the wrapping mechanism to fold the wrappers about the gums during the advance thereof through the mechanism, a receiving chamber into which the wrapped gums are delivered on edge one at a time from the wrapping mechanism, a reversing device between the wrapping mechanism and receiving chamber, an assembling chamber located at one side of said receiving chamber and communicating therewith, a plunger for transferring the wrapped gums one at a time from the receiving chamber to the assembling chamber, and a yielding device extending through the wall of the assembling chamber opposite the opening therein through which it communicates with the receiving chamber and against the action of which the gums are transferred by said plunger from the receiving to the assembling chamber.

31. In a machine for the purpose set forth, the combination of a wrapping mechanism, means for feeding wrappers and gums to the wrapping mechanism and advancing the same therethrough, means operating the wrapping mechanism to fold the wrappers about the gums during the advance thereof through said mechanism, a receiving chamber into which the wrapped gums are delivered one at a time from the wrapping mechanism, a reversing device between the wrapping mechanism and receiving chamber, an assembling chamber located at one side of the receiving chamber and communicating therewith, a plunger for transferring the wrapped gums one at a time from the receiving chamber to the assembling chamber, and a yielding device in the assembling chamber against the action of which the gums are transferred by the plunger from the receiving chamber to the assembling chamber.

32. In a machine for the purpose set forth, the combination of a wrapping mechanism, means for feeding wrappers and gums to the wrapping mechanism and advancing the same therethrough, means operating the wrapping mechanism to fold the wrappers about the gums during the advance thereof through the wrapping mechanism, a receiving chamber into which the wrapped gums are delivered on edge one at a time from the wrapping mechanism, an assembling chamber located at one side of the receiving chamber and communicating therewith, a plunger for transferring the wrapped gums one at a time from the receiving chamber to the assembling chamber, a yielding device in the assembling chamber against the action of which the gums are transferred by the plunger from the receiving chamber to the assembling chamber, and means located between the receiving and assembling chambers which is movable to permit the gums to be transferred from the receiving to the assembling chamber and arranged to prevent the gums being moved backwardly under the action of said yielding device from the assembling to the receiving chamber.

33. In a machine for the purpose set forth, the combination of the wrapping mechanism, means for feeding the wrappers adjacent thereto, means for feeding gums adjacent to the wrapping mechanism, means operating the wrapping mechanism to fold the wrappers about the gums, a receiving chamber in which the said wrapped gums are delivered on edge one at a time, a discharge chute located at one side of said chamber and opening laterally thereinto, a push bar reciprocating through said receiving chamber for delivering the wrapped gums one at a time from the chamber to the discharge chute, a spring pressed device in said chamber normally separating said chamber from the discharge chute and adapted to be retracted to permit the push-bar to transfer the gums from said chamber to the discharge chute, and an ejector for ejecting groups of gums from the discharge chute.

34. In a machine for the purpose set forth, the combination of the wrapping mechanism, means for feeding the wrappers adjacent thereto, means for feeding gums adjacent to the wrapping mechanism, means operating the wrapping mechanism to fold the wrappers about the gums, a chamber in which the wrapped gums are delivered on edge one at a time, a discharge chute at one side of said chamber and opening laterally thereinto, a push bar reciprocating through said chamber for delivering the wrapped gums one at a time from the chamber to the discharge chute, a spring-pressed device in said chamber normally separating the chamber from the discharge chute, and adapted to be retracted to permit the push bar to transfer the gums one at a time from said chamber to the discharge chute, a yielding member adapted to press the gums in said chute against the ends of the spring-pressed device to hold the gums flatwise together and an ejector for ejecting groups of gums from the discharge chute.

35. A machine for the purpose set forth, comprising a feed chute, a feed way or slot constituting in part the bottom of said chute, a wrapping mechanism, a feed bar reciprocating through the bottom of the feed chute for delivering gums one by one from the chute to the wrapping mechanism, means for delivering wrappers to the wrapping mechanism, means operating the wrapping mechanism to fold the wrappers about the gums, a chamber into which the wrapped gums are discharged on edge one by one, a discharge chute at the side of said chamber and opening laterally thereinto, a push bar reciprocating through said chamber for delivering the wrapped gums one by one from said chamber to the discharge chute, and means for operating said feed bar and push bar, comprising a rock-shaft, an arm fixed to the rock-shaft and operatively connected with said feed bar, a cam on the pivot bar provided with a cam slot, and a pin on the lever of said rock-shaft engaging a cam slot.

In testimony, that I claim the foregoing as my invention I affix my signature in presence of two witnesses, this 15th day of June A. D. 1905.

HARRY Y. ARMSTRONG.

Witnesses:
WILLIAM L. HALL,
G. R. VILKINS.